(12) United States Patent
Bonk et al.

(10) Patent No.: US 9,610,862 B2
(45) Date of Patent: Apr. 4, 2017

(54) SEAT POSITION SENSING AND ADJUSTMENT

(71) Applicant: Faurecia Automotive Seating, LLC, Auburn Hills, MI (US)

(72) Inventors: Jeffery T Bonk, Chesterfield, MI (US); Dale J Frye, West Olive, MI (US); Matthew Shinew, Grand Rapids, MI (US); Christopher L Hogg, Holland, MI (US)

(73) Assignee: Faurecia Automotive Seating, LLC, Troy, MI (US)

( * ) Notice: Subject to any disclaimer, the term of this patent is extended or adjusted under 35 U.S.C. 154(b) by 0 days.

(21) Appl. No.: 14/878,306

(22) Filed: Oct. 8, 2015

(65) Prior Publication Data

US 2016/0101710 A1    Apr. 14, 2016

Related U.S. Application Data

(60) Provisional application No. 62/063,679, filed on Oct. 14, 2014.

(51) Int. Cl.
| | |
|---|---|
| *B60R 21/0132* | (2006.01) |
| *B60R 21/015* | (2006.01) |
| *B60N 2/02* | (2006.01) |
| *B60N 2/06* | (2006.01) |
| *B60N 2/22* | (2006.01) |

(52) U.S. Cl.
CPC ............. *B60N 2/0252* (2013.01); *B60N 2/06* (2013.01); *B60N 2/22* (2013.01); *B60N 2002/0272* (2013.01)

(58) Field of Classification Search
CPC ........... B60N 2/0252; B60N 2/22; B60N 2/06
USPC ............. 297/217.2, 313, 314, 344.1–344.17, 297/354.1, 354.12
See application file for complete search history.

(56) References Cited

U.S. PATENT DOCUMENTS

| | | | |
|---|---|---|---|
| 3,591,232 A * | 7/1971 | Simon | B60R 21/02 297/216.1 X |
| 4,267,494 A | 5/1981 | Matsuoka et al. | |
| 4,689,537 A | 8/1987 | Mizuta et al. | |
| 5,123,495 A | 6/1992 | Littlejohn et al. | |
| 5,244,252 A * | 9/1993 | Serber | A47C 3/0255 297/216.19 |
| 5,311,962 A | 5/1994 | Nakano et al. | |
| 5,321,617 A | 6/1994 | Mori et al. | |
| 5,556,160 A * | 9/1996 | Mikami | B60N 2/4221 297/216.1 |
| 5,558,399 A * | 9/1996 | Serber | B60N 2/4221 297/216.1 |
| 5,573,269 A | 11/1996 | Gentry et al. | |

(Continued)

FOREIGN PATENT DOCUMENTS

| | | |
|---|---|---|
| DE | 19522897 A1 | 1/1997 |
| DE | 19753059 A1 | 6/1999 |

(Continued)

*Primary Examiner* — Rodney B White
(74) *Attorney, Agent, or Firm* — Barnes & Thornburg LLP

(57) ABSTRACT

A vehicle seat includes a seat foundation coupled to a floor of a vehicle, a seat bottom coupled to the seat foundation to move back and forth along a longitudinal axis relative to the floor, and a seat back coupled to the seat bottom to extend upwardly away from the seat bottom. The seat back pivots about an axis relative to the seat bottom.

18 Claims, 9 Drawing Sheets

(56) References Cited

U.S. PATENT DOCUMENTS

| | | | |
|---|---|---|---|
| 5,626,203 A * | 5/1997 | Habib | B60N 2/0276 297/216.18 X |
| 6,026,920 A | 2/2000 | Obeda et al. | |
| 6,062,642 A | 5/2000 | Sinnhuber et al. | |
| 6,105,706 A | 8/2000 | Cooper | |
| 6,196,633 B1 | 3/2001 | Yamamoto et al. | |
| 6,213,558 B1 | 4/2001 | Axelson et al. | |
| 6,364,352 B1 * | 4/2002 | Norton | G01G 19/4142 280/735 |
| 6,435,591 B1 * | 8/2002 | Nilsson | B60N 2/4228 297/216.14 X |
| 6,435,592 B2 * | 8/2002 | Nilsson | B60N 2/4228 297/216.14 X |
| 6,470,746 B1 | 10/2002 | Murayama et al. | |
| 6,480,616 B1 | 11/2002 | Hata et al. | |
| 6,940,026 B2 | 9/2005 | Rundell et al. | |
| 7,478,875 B2 * | 1/2009 | Patterson | B60N 2/002 297/217.2 X |
| 7,523,803 B2 * | 4/2009 | Breed | H04Q 9/00 297/217.3 X |
| 7,614,699 B2 * | 11/2009 | Torres | A61G 5/045 297/344.14 |
| 7,667,345 B2 | 2/2010 | Budweg et al. | |
| 7,976,060 B2 * | 7/2011 | Breed | 297/217.2 X |
| 8,744,694 B2 * | 6/2014 | Ystueta | 180/271 |
| 8,973,886 B2 * | 3/2015 | Breen | B60N 2/501 297/217.3 X |
| 2001/0010424 A1 | 8/2001 | Osmer et al. | |
| 2002/0109063 A1 * | 8/2002 | Jaudouin | B60N 2/067 297/344.1 X |
| 2002/0130528 A1 * | 9/2002 | Mans | B60N 2/4214 297/216.1 X |
| 2003/0052519 A1 * | 3/2003 | Reynolds | B60N 2/42763 297/216.1 |
| 2003/0060957 A1 | 3/2003 | Okamura et al. | |
| 2003/0067196 A1 | 4/2003 | Sakamoto et al. | |
| 2003/0117000 A1 | 6/2003 | Barnabo et al. | |
| 2005/0200183 A1 * | 9/2005 | Morinet | B60N 2/0248 297/354.1 |
| 2006/0061158 A1 * | 3/2006 | Dennis | B60N 2/4242 297/216.16 |
| 2006/0103192 A1 * | 5/2006 | Norton | B60N 2/002 297/217.2 |
| 2007/0063566 A1 * | 3/2007 | Browne | B60N 2/4221 297/344.11 |
| 2008/0036252 A1 * | 2/2008 | Breed | B60J 10/00 297/217.2 |
| 2008/0252113 A1 * | 10/2008 | Alexander | B60N 2/4885 297/216.12 |
| 2009/0134557 A1 * | 5/2009 | Spangler | B60N 2/38 297/217.3 X |
| 2010/0253498 A1 * | 10/2010 | Rork | B60N 2/002 297/217.2 X |
| 2012/0001463 A1 * | 1/2012 | Breed | B60J 10/00 297/217.2 |
| 2012/0086249 A1 * | 4/2012 | Hotary | B60N 2/0228 297/284.3 |
| 2013/0062921 A1 * | 3/2013 | Meyer | B60N 2/5685 297/354.1 X |
| 2014/0077538 A1 * | 3/2014 | Hiemenz | B60N 2/4242 297/217.2 |
| 2014/0203602 A1 * | 7/2014 | Robbins | B60N 2/501 297/217.2 |
| 2014/0217792 A1 * | 8/2014 | Meyer | H02H 7/122 297/354.1 X |
| 2014/0225408 A1 * | 8/2014 | Scully | B60N 2/0244 297/344.21 |
| 2015/0351981 A1 * | 12/2015 | Sazonov | A61B 5/6894 297/217.2 |
| 2016/0081483 A1 * | 3/2016 | Harrison | A47C 31/126 297/217.2 |
| 2016/0280098 A1 * | 9/2016 | Frye | B60N 2/0228 |

FOREIGN PATENT DOCUMENTS

| | | |
|---|---|---|
| DE | 19811959 A1 | 9/1999 |
| EP | 0233421 A1 | 8/1987 |

* cited by examiner

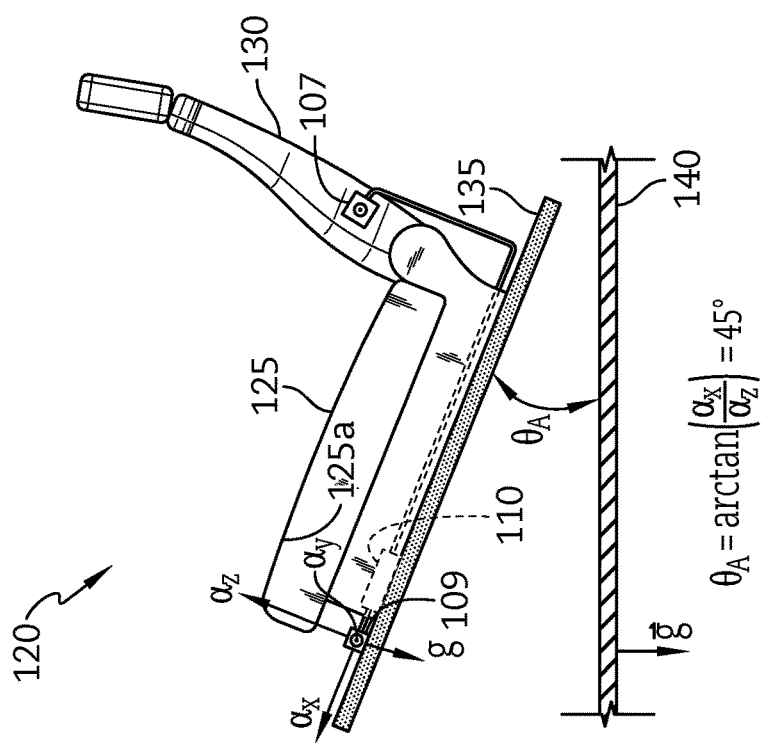
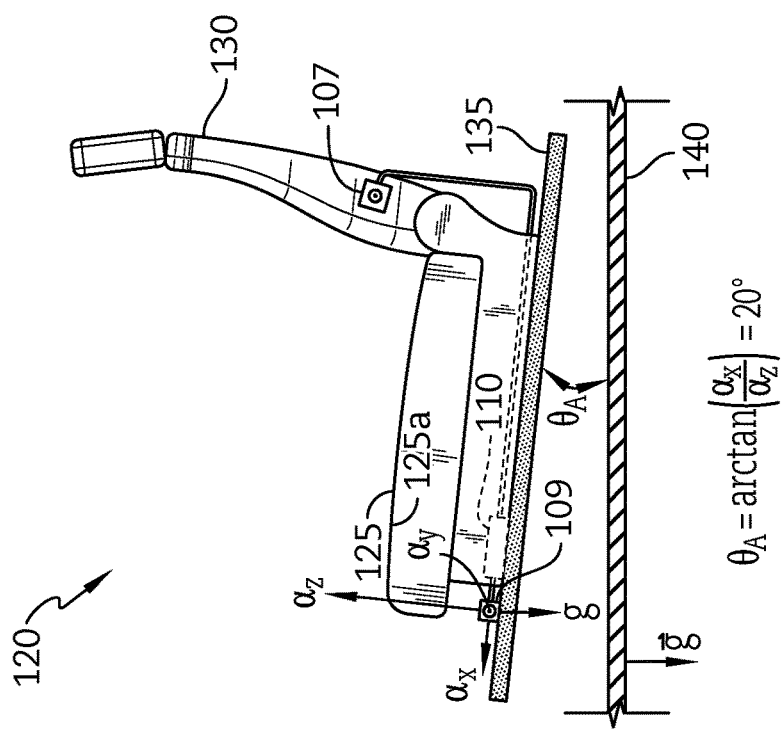
FIG. 3A
FIG. 3B

SEAT POSITION SENSING AND ADJUSTMENT

PRIORITY CLAIM

This application claims priority under 35 U.S.C. §119(e) to U.S. Provisional Application Ser. No. 62/063,679, filed Oct. 14, 2014, which is expressly incorporated by reference herein.

BACKGROUND

The present disclosure relates to a seat position sensing system, and in particular to a seat position sensing system within a passenger vehicle. More particularly, the present disclosure relates to a seat position sensing system with sensors.

SUMMARY

According to the present disclosure, a vehicle seat includes a seat foundation coupled to a floor of a vehicle, a seat bottom coupled to the seat foundation to move back and forth along a longitudinal axis relative to the floor, and a seat back coupled to the seat bottom to extend upwardly away from the seat bottom. The seat back pivots about an axis relative to the seat bottom.

In illustrative embodiments, the vehicle seat further includes a seat-position sensing system that includes a seat-orientation unit and a seat-motion controller. The seat-orientation unit includes a vehicle-orientation sensor in the form of an accelerometer coupled to the vehicle floor and configured to sense a gravity-based incline angle of the vehicle floor, and also includes a seat-back sensor in the form of an accelerometer coupled to the seat back to move therewith and configured to sense a gravity-based recline angle of the seat back.

In illustrative embodiments, the seat-orientation unit also includes a linear position sensor having an accelerometer whose readings can be used to compute a longitudinal position of the vehicle seat relative to the vehicle floor. The accelerometer is rotatably coupled through a reduction unit to a roller that rolls along a track affixed to the vehicle floor as the vehicle seat moves longitudinally forwards and backwards. A distance of longitudinal movement of the vehicle seat can be computed based on an amount of rotation of the accelerometer.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective and diagrammatic view of a seat position sensing system including a seat-orientation unit configured to sense an orientation of a vehicle floor and a seat back relative to gravity so that a recline angle for the seat back relative to the vehicle floor may be calculated, and a seat-motion controller configured to move or facilitate manual adjustment of the seat back to predetermined angles of recline stored in the seat-motion controller;

FIG. 2 is an elevation view of the seat position sensing system of FIG. 1 showing that the seat-orientation unit includes a vehicle-orientation sensor coupled to the vehicle floor and configured to sense a gravity-based incline angle of the vehicle relative to gravity and a seat-back sensor coupled to the seat back to move therewith and configured to sense a gravity-based recline angle of the seat back relative to gravity and suggesting that the seat-orientation unit determines an adjusted recline angle of the seat back relative to the vehicle floor by subtracting the gravity-based incline angle of the vehicle floor from the gravity-based recline angle of the seat back;

FIGS. 3A and 3B are a series of elevation views of the seat position sensing system of FIG. 1 suggesting that the gravity-based incline angle measured by the vehicle-orientation sensor varies depending on the angle of incline of the vehicle floor relative to gravity;

Figure 7:
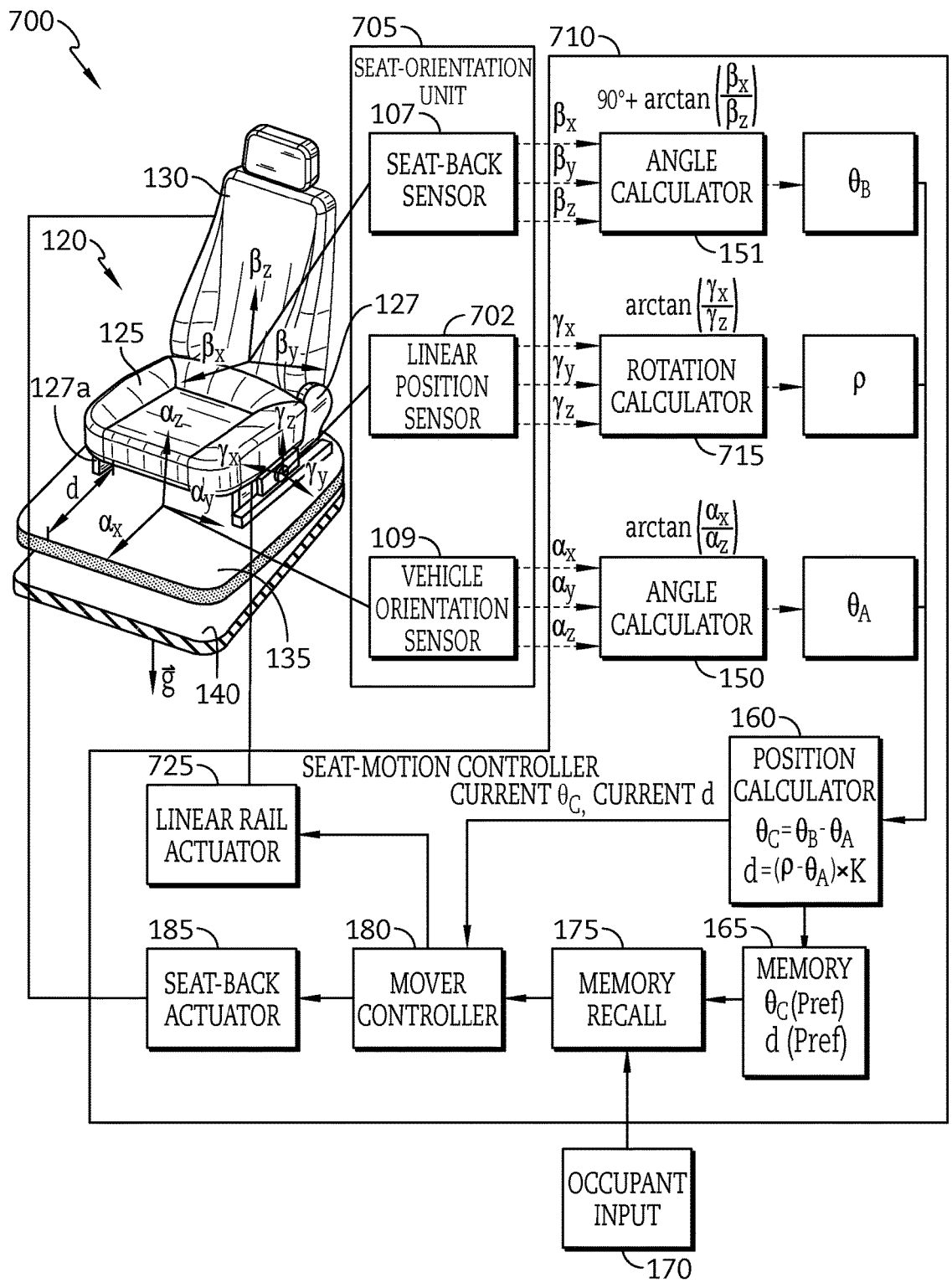
Figure 8:
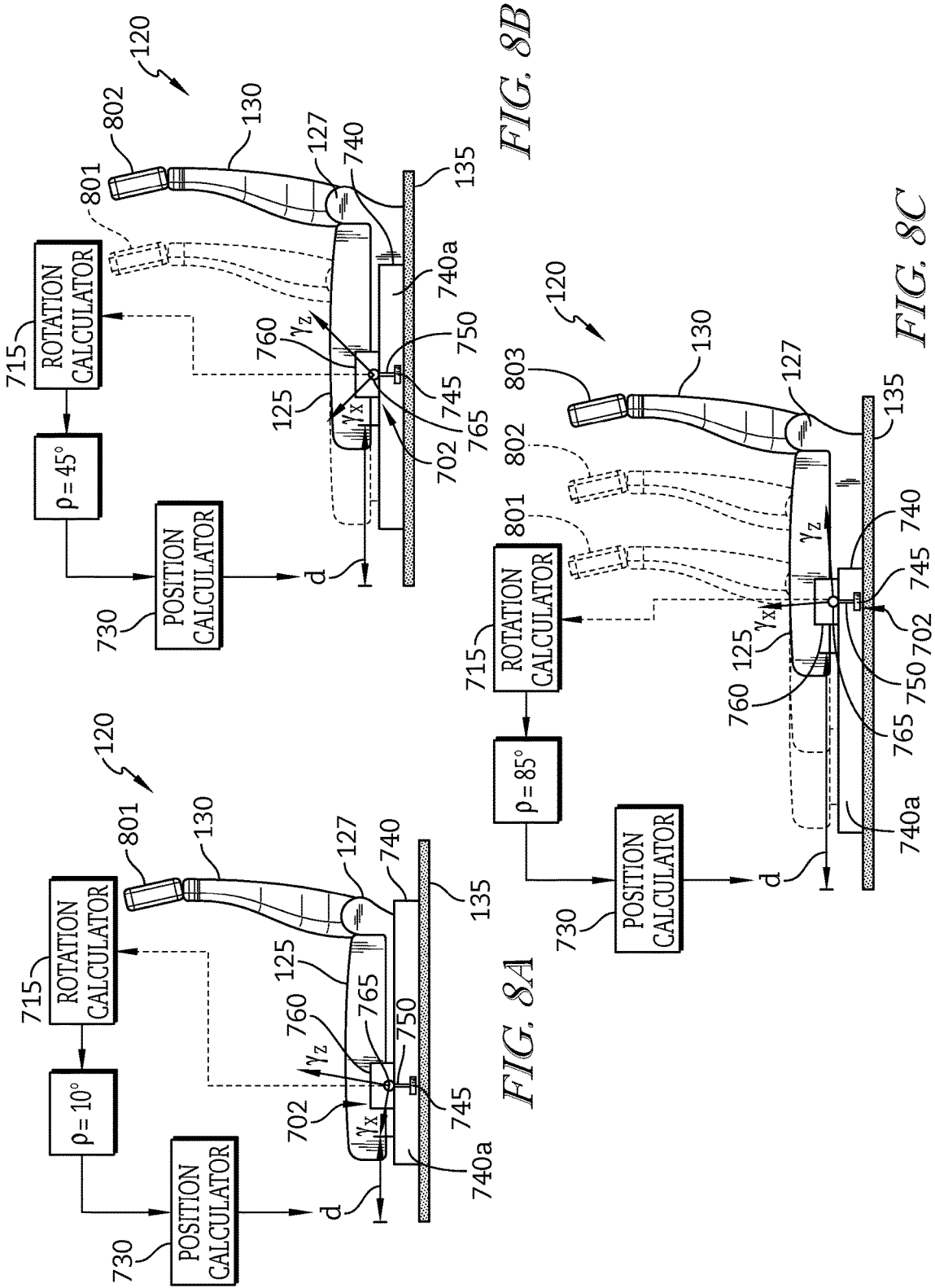
Figure 9:
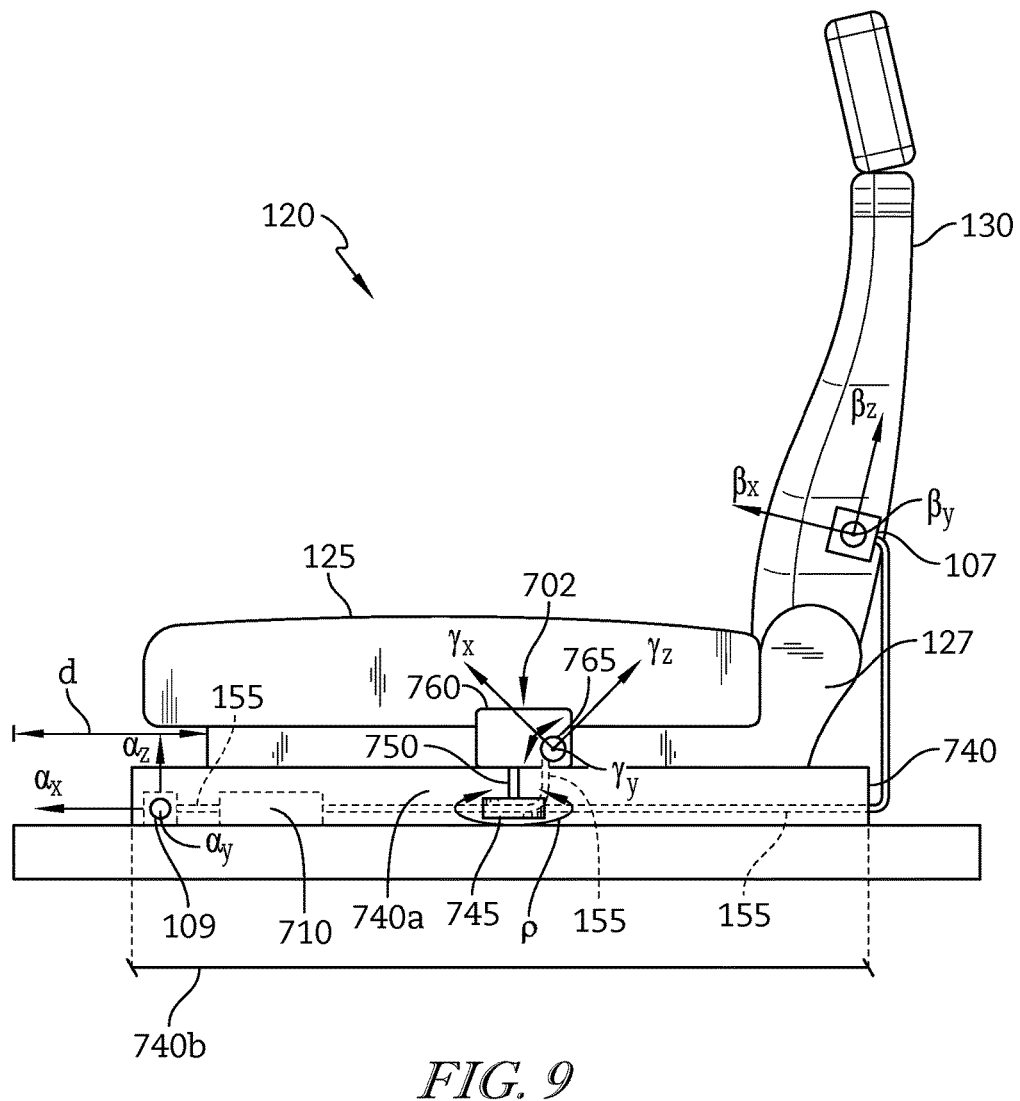

FIG. 7 is a perspective and diagrammatic view of a second embodiment of a seat position sensing system in accordance with the present disclosure showing that the seat-orientation unit further includes a linear position sensor coupled to the seat bottom to move therewith and configured to provide measurements used to calculate a longitudinal position of the vehicle seat relative to the vehicle floor;

FIGS. 8A-C are a series of elevation views of the seat position sensing system of FIG. 7 showing a vehicle seat at three respective longitudinal positions relative to the vehicle floor, and showing that vector measurements relative to gravity from the linear position sensor are used to calculate a rotation of the linear position sensor and that the computed rotation is used to calculate the longitudinal position of the vehicle seat; and FIG. 9 is an elevation view of the seat position sensing system of FIG. 7 showing that the linear position sensor includes an accelerometer, a roller configured to roll along a track affixed to the vehicle floor as the vehicle seat moves longitudinally forwards or backwards, and a gearbox that interconnects the accelerometer and the roller to cause rotation of the roller to be translated into rotation of the accelerometer so that the longitudinal position of the vehicle seat may be calculated.

DETAILED DESCRIPTION

A first embodiment of a seat position sensing system 100 in accordance with the present disclosure is shown, for example, in FIGS. 1-6. A second embodiment of a seat position sensing system 700 is shown, for example, in FIGS. 7-9. Seat position sensing system 100 calculates a recline angle for a seat back relative to a vehicle floor, and in illustrative embodiments moves or facilitates manual adjustment the seat back to a previously calculated, occupant-preferred recline angle in response to occupant instructions. Seat position sensing system 700 also calculates a recline angle for a seat back relative to a vehicle floor, and in addition calculates a longitudinal position of the vehicle seat relative to the vehicle floor. In illustrative embodiments, seat position sensing system 700 moves or facilitates manual adjustment of the seat back to a previously calculated, occupant-preferred recline angle and moves or facilitates manual adjustment of the seat to a previously calculated, occupant-preferred longitudinal position in response to occupant instructions.

A seat position sensing system 100 (also called occupant-support sensing system 100) in accordance with the present disclosure is shown in FIGS. 1-6. Seat position sensing system 100 is used, for example, in a vehicle 143 in connection with a vehicle seat 120 (also called an occupant support 120) having a seat bottom 125 and a seat back 130. Seat bottom 125 includes a seat foundation 127 anchored to a vehicle floor 135. Seat back 130 extends upwardly from seat bottom 125 and is rotationally movable in relation to seat bottom 125 about pivot axis 195 through either powered or manual mechanisms, as will be described below. Variable angles of orientation exist among seat back 130, seat bottom 125, vehicle floor 135, and a reference plane 140. Reference plane 140 provides a measurement reference for variable angles of orientation to be discussed herein, and is established such that a gravity vector (g) extends normal to reference plane 140 as shown in FIGS. 1-6.

Seat position sensing system 100 includes a seat-orientation unit 105 (also called support-orientation unit 105) and a seat-motion controller 110 (also called support-motion controller 110). Seat-orientation unit 105 senses orientations of seat back 130 and vehicle floor 135 relative to gravity and communicates these orientations to seat-motion controller 110. Seat-motion controller 110 calculates a vehicle incline angle, an actual seat back recline angle, and an adjusted seat back recline angle relative to the vehicle incline angle. By calculating an adjusted seat back recline angle relative to the vehicle incline angle, seat position sensing system 100 can sense and store a recline angle of seat back 130 in a manner that controls for uneven terrain on which vehicle 143 may drive, such as inclined hills. This allows seat position sensing system 100 to store occupant-preferred recline angles for seat back 130, and to later move or facilitate manual adjustment of seat back 130 to occupant-preferred recline angles, regardless of the terrain on which vehicle 143 is positioned.

Seat-orientation unit 105 includes a vehicle orientation sensor 109 and a seat-back sensor 107. Vehicle orientation sensor 109 is configured to sense an orientation of vehicle 143, and in particular vehicle floor 135, relative to gravity. Seat-back sensor 107 is configured to sense an orientation of seat back 130, and in particular a recline angle of seat back 130, relative to gravity.

Figure 1:
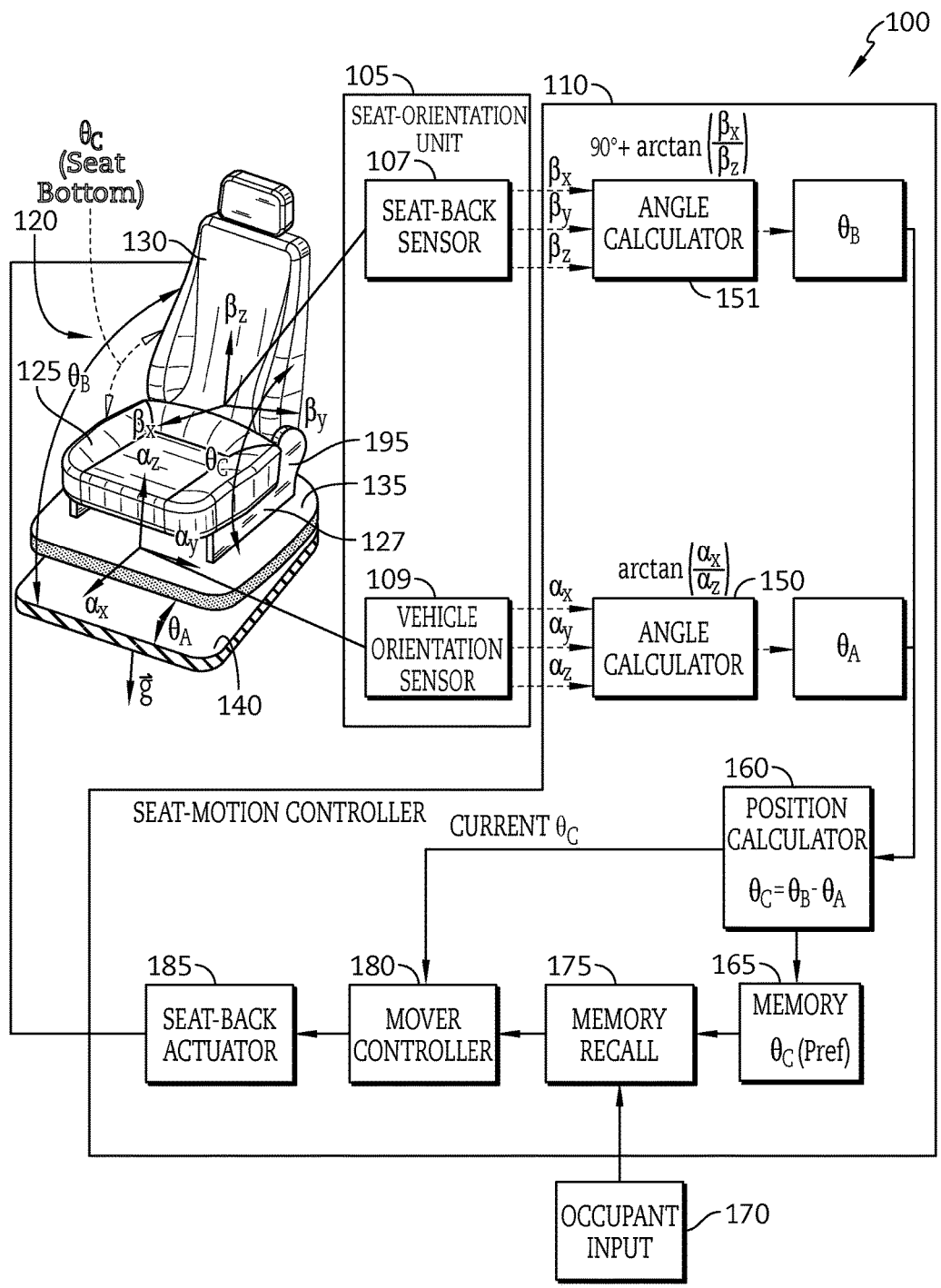
Figure 2:
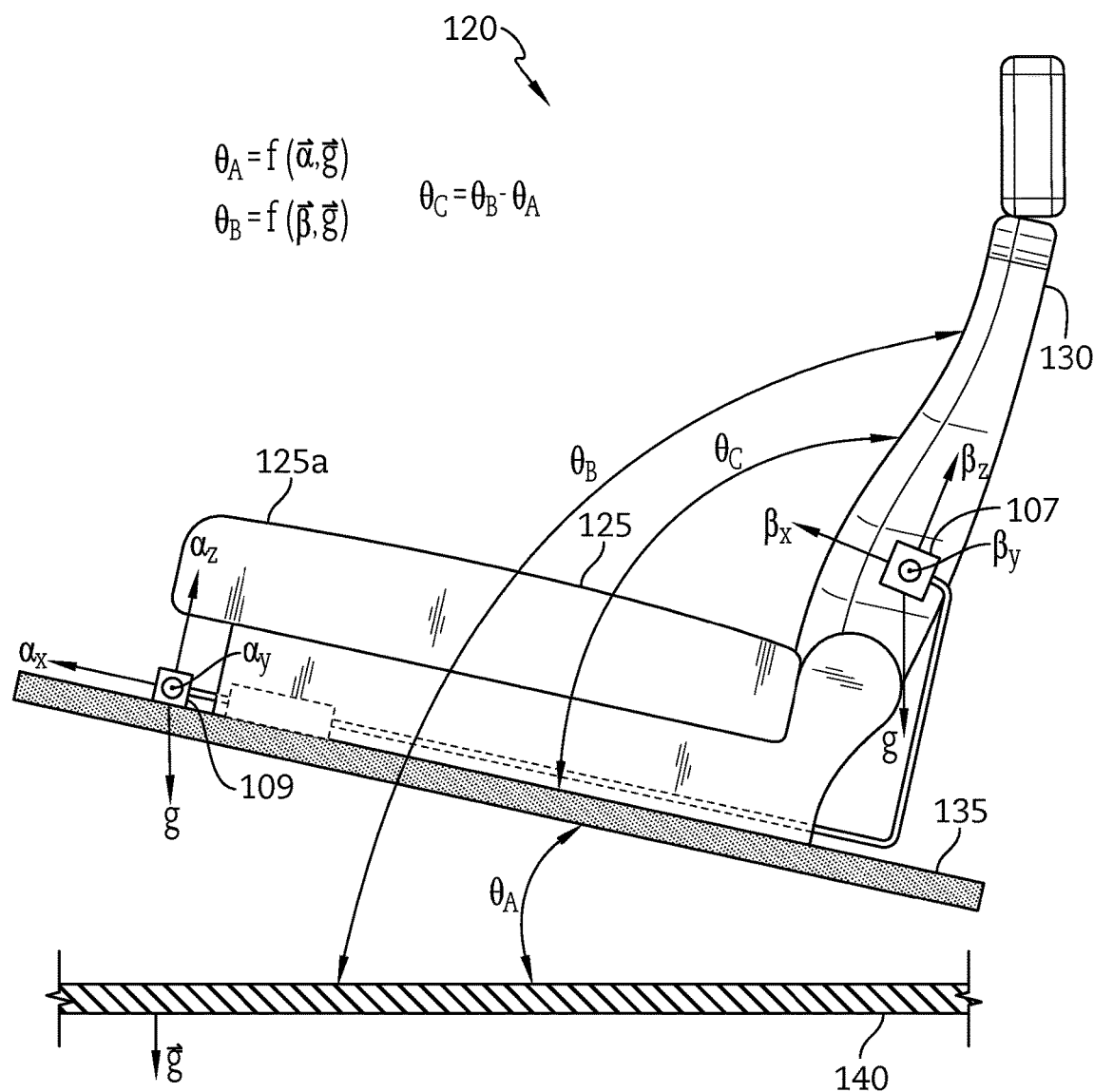

To sense an orientation of vehicle floor 135 relative to gravity, vehicle orientation sensor 109 includes an accelerometer measuring and outputting accelerations $(\alpha_x)$, $(\alpha_y)$, and $(\alpha_z)$ relative to gravity along three directional axes x, y, and z, as suggested in FIGS. 1, 2, and 3. Vehicle orientation sensor 109 communicates accelerations $(\alpha_x)$, $(\alpha_y)$, and $(\alpha_z)$ to seat-motion controller 110, which calculates a vehicle incline angle $(\theta_A)$. Vehicle incline angle $(\theta_A)$ represents a variable angle between reference plane 140 and vehicle floor 135. Thus, $(\theta_A)$ may take on smaller values when vehicle 143 is on flat terrain and may take on larger values when vehicle 143 is driving up a hill having a high grade. Accelerations $(\alpha_x)$, $(\alpha_y)$, and $(\alpha_z)$ may be encoded digitally and transmitted with any suitable resolution, and illustratively may be transmitted with 10 bit resolution. Vehicle orientation sensor 109 may discard a certain number of least significant bits, such as the two least significant bits, to suppress noise.

To sense a recline angle of seat back 130 relative to gravity, seat-back sensor 107 includes an accelerometer measuring and outputting accelerations $(\beta_x)$, $(\beta_y)$, and $(\beta_z)$ relative to gravity along three directional axes x, y, and z, as suggested in FIGS. 1 and 2. Seat-back sensor 107 communicates accelerations $(\beta_x)$, $(\beta_y)$, and $(\beta_z)$ to seat-motion controller 110, which calculates an actual seat back recline angle $(\theta_B)$. Actual seat back recline angle $(\theta_B)$ represents a variable angle between seat back 130 and reference plane 140. Thus, $(\theta_B)$ may take on larger values in situations where seat back 130 is reclined backward, and may also take on larger values when vehicle 143 is positioned on a hill having a high grade. Accelerations $(\beta_x)$, $(\beta_y)$, and $(\beta_z)$ may be encoded digitally and transmitted with any suitable resolution, and illustratively may be transmitted with 10 bit resolution. Seat-back sensor 107 may discard a certain number of least significant bits, such as the two least significant bits, to suppress noise.

Seat-motion controller 110 then subtracts vehicle incline angle $(\theta_A)$ from actual seat back recline angle $(\theta_B)$ to calculate an adjusted seat back recline angle $(\theta_C)$. Adjusted seat back recline angle $(\theta_C)$ represents a variable angle between seat back 130 and vehicle floor 135, as suggested in FIGS. 1 and 2. As a result, adjusted seat back recline angle $(\theta_C)$ measures the seat back recline angle, controlling for any uneven terrain that vehicle 143 may be driving on, such as an inclined hill. Adjusted seat back recline angle $(\theta_C)$ will take on larger values in situations where seat back 130 reclines backward, but will generally not change when vehicle 143 moves from flat terrain to inclined terrain and vice versa.

By calculating adjusted seat back recline angle $(\theta_C)$, seat positioning system 100 can gauge an amount of seat back recline in a manner that is independent of terrain on which vehicle 143 is driving. This is beneficial because the terrain may vary from one moment to the next, causing variations in the angular orientation of vehicle 143. A vehicle occupant, however, will generally seek a comfortable seat orientation relative to vehicle 143 regardless of angular orientations of vehicle 143. As such, from an occupant comfort perspective, adjusted seat back recline angle $(\theta_C)$ is more relevant than actual seat back recline angle $(\theta_B)$.

Seat-motion controller includes a first angle calculator 150 for calculating vehicle incline angle $(\theta_A)$, a second angle calculator 151 for calculating actual seat back recline angle $(\theta_B)$, and a position calculator 160 for computing adjusted seat back recline angle $(\theta_C)$. To calculate vehicle incline angle $(\theta_A)$, first angle calculator 150 uses mathematical formulae that factor how vehicle incline angle $(\theta_A)$ varies as a function of accelerations $(\alpha_x)$, $(\alpha_y)$, and $(\alpha_z)$, each of which are measured relative to gravity, as suggested by FIG. 2. In this illustrative embodiment, the formula [arctan$((\alpha_x)/(\alpha_z))$] is used to compute $(\theta_A)$, as shown in FIG. 1. Similarly, second angle calculator 151 uses mathematical formulae that factor how actual seat back recline angle $(\theta_B)$ varies as a function of accelerations $(\beta_x)$, $(\beta_y)$, and $(\beta_z)$, each of which are measured relative to gravity, as suggested in FIG. 2. In this illustrative embodiment, the formula [90°+arctan $((\beta_x)/(\beta_z))$] is used to compute $(\theta_B)$.

Position calculator 160 computes adjusted seat back recline angle $(\theta_C)$ as a difference between actual seat back recline angle $(\theta_B)$ and vehicle incline angle $(\theta_A)$—i.e., [$(\theta_B)-(\theta_A)$]. This is because, as explained, adjusted seat back recline angle $(\theta_C)$ represents a recline angle of the seat back 130 relative to an incline angle of the vehicle 143, which enables the seat position sensing system 100 to control for inclines on which the vehicle 143 may be driving.

The operation of the first angle calculator 150 is illustrated in more detail by FIGS. 3A and 3B. FIG. 3A shows a situation in which vehicle 143 is on a moderate incline, such that vehicle incline angle ($\theta_A$) is 20 degrees. Here, acceleration ($\alpha_y$) may be close to 0 because its directional orientation is approximately perpendicular to gravity vector (g). Acceleration ($\alpha_z$) may have large magnitude, because its directional orientation is only 20 degrees removed from diametrically opposing gravity vector (g). Acceleration ($\alpha_x$) may have a relatively small magnitude, because its directional orientation is only 20 degrees removed from being perpendicular to gravity vector (g). A relatively large value for ($\alpha_z$) in combination with a relatively small value for ($\alpha_x$) results in a relatively small quotient [($\alpha_x$)/($\alpha_z$)], which in turn results in a relatively small result for the [arctan(($\alpha_x$)/($\alpha_z$))] calculation, namely, 20°.

FIG. 3B, in contrast, shows a situation in which vehicle 143 is on a steeper incline, with vehicle incline angle ($\theta_A$) being 45 degrees. Here, acceleration ($\alpha_y$) may still be close to 0 because its directional orientation is approximately perpendicular to gravity vector (g). Acceleration ($\alpha_z$) may be smaller in magnitude in comparison to FIG. 3B, because its directional orientation is farther removed from diametrically opposing, and closer to being perpendicular to, gravity vector (g). Acceleration ($\alpha_x$), on the other hand, may have increased in magnitude in comparison to FIG. 3B, because its directional orientation is farther removed from being perpendicular to gravity vector (g). In this example, accelerations ($\alpha_z$) and ($\alpha_x$) are equal in magnitude, resulting in a higher value for the quotient [($\alpha_x$)/($\alpha_z$)] as compared to the example of FIG. 3A. This results in a larger value for the [arctan(($\alpha_x$)/($\alpha_z$))] calculation than the example of FIG. 3A, namely, 45°.

The operation of second angle calculator 151 is similar, in this example, to the operation of first angle calculator 150, with two differences. First, accelerations ($\beta_x$), ($\beta_y$), and ($\beta_z$) measured by seat-back sensor 107 are used rather than accelerations ($\alpha_x$), ($\alpha_y$), and ($\alpha_z$). Second, second angle calculator 151 adds 90° to the [arctan(($\beta_x$)/($\beta_z$))] computation. This is because seat back 130 is in a vertically upright position when seat back 130 is not reclined at all. As such, a 0° seat back recline angle ($\theta_B$) should correspond to a situation in which seat back 130 is actually 90° displaced from reference plane 140. As such, a 90° adjustment is added to the computation [arctan (($\beta_x$)/($\beta_z$))].

As explained, position calculator 160 computes adjusted seat back recline angle ($\theta_C$) as a difference between actual seat back recline angle ($\theta_B$) and vehicle incline angle ($\theta_A$)—i.e., [($\theta_B$)−($\theta_A$)]. After an occupant of vehicle 143 adjusts seat back 130 to a desired orientation, position calculator 160 may store the value of adjusted seat back recline angle ($\theta_C$), as computed at that time, to memory 165. Memory 165 stores this value as a preferred seat back recline angle ($\theta_C$(pref)). Memory 165 may include any suitable form of transitory or non-transitory computer-readable media, including memory media such as RAM, ROM, EEPROM, CD-ROM or other optical disk storage, magnetic disk storage or other magnetic storage devices, or any other medium which can be used to carry or store computer-readable data.

By storing ($\theta_C$(pref)) in memory, an occupant may later instruct seat motion controller 110 to return seat back 130 to preferred seat back recline angle ($\theta_C$(pref)). In other embodiments, an occupant may later manually move seat back 130, and seat motion controller 110 may engage a locking mechanism when seat back 130 is at the preferred seat back recline angle ($\theta_C$(pref)). Thus, in illustrative embodiments, seat-motion controller 110 also includes components that subsequently adjust seat back 130 to a preferred orientation, or that disengage and engage locking mechanisms at appropriate times based on manual occupant adjustments. These components include a mechanism for occupant input 170, a memory recall 175, a mover controller 180, and a seat-back actuator 185.

As explained, an occupant, during a subsequent use of vehicle 143, may desire to have seat back 130 adjusted to preferred seat back recline angle ($\theta_C$(pref)). Seat motion controller 110 may include powered mechanisms for adjusting seat back 130. Illustratively, the occupant uses occupant input 170 to instruct seat position sensing system 100 that seat back 130 should be adjusted to preferred seat back recline angle ($\theta_C$(pref)). Occupant input can be provided by a variety of mechanisms. For example, vehicle 143 may include an electrical push-button (not shown) programmed to initiate movement of seat back 130 to a preferred orientation. Alternatively, vehicle 143 may include a touch screen interface (not shown) provided on or near a dashboard, within a head unit, or otherwise visible to the occupant. By navigating among graphical icons displayed on the touch screen interface, the occupant may select a graphical icon that initiates movement of seat back 130 to a preferred orientation. In response to receiving an instruction from the occupant through occupant input 170, memory recall 175 retrieves preferred seat back recline angle ($\theta_C$(pref)). Memory recall 175 communicates ($\theta_C$(pref)) to mover controller 180.

Illustratively, mover controller 180 automatically rotates seat back 130 relative to seat bottom 125 as necessary until a current seat back recline angle ($\theta_C$), as computed by position calculator 160, is equal to preferred seat back recline angle ($\theta_C$(pref)). Mover controller receives from position calculator 160 a current seat back recline angle ($\theta_C$). Mover controller 180 sends instructions to seat-back actuator 185 to rotate seat back 130 relative to seat bottom 125 either forwards or backwards, depending on how current seat back recline angle ($\theta_C$) compares to ($\theta_C$(pref)). Seat-back actuator 185 may power a motor (not shown) that can rotate seat back 130 relative to seat bottom 125 about pivot axis 195.

For example, if current seat back recline angle ($\theta_C$) is larger than ($\theta_C$(pref)), mover controller 180 will instruct seat-back actuator 185 to rotate seat back 130 forward. If current seat back recline angle ($\theta_C$) is smaller than ($\theta_C$(pref)), mover controller 180 will instruct seat-back actuator 185 to rotate seat back 130 backward. Seat-back actuator 185 will power a motor, which will perform appropriate rotations of seat back 130.

As seat back actuator 185 rotates seat back 130 through the powered motor, mover controller 180 continues to receive results of updated calculations from position calculator 160 regarding current seat back recline angle ($\theta_C$). For example, mover controller 180 retrieves updated calculations at a predetermined sampling rate, such as 10 times per second, 100 times per second, etc. Mover controller 180 continues to issue instructions to seat back actuator 185 as appropriate, depending on how current seat back recline angle ($\theta_C$) compares to ($\theta_C$(pref)). For example, if seat back actuator 185 rotates seat back 130 too far, as to overshoot ($\theta_C$(pref)), mover controller 180 may instruct seat back actuator 185 to reverse direction of rotation of seat back 130.

When current seat back recline angle ($\theta_C$) is equal to, or within a predetermined tolerance of, ($\theta_C$(pref)), mover controller 180 instructs seat back actuator 185 to cease rotation. Seat back 130 will then be in the orientation preferred by the occupant.

In other embodiments, mover controller 180 facilitates an occupant in manually rotating seat back 130 relative to seat bottom 125 as necessary until current seat back recline angle ($\theta_C$) is equal to preferred seat back recline angle ($\theta_C(\text{pref})$). In such embodiments, vehicle seat 120 may include a selectively releasable locking mechanism (not shown) powered by seat-back actuator 185 that can occupy open and locked positions. In an open position, seat back 130 is permitted to rotate relative to seat bottom 125. In a locked position, seat back 130 is blocked from rotation relative to seat bottom 125. Seat-back actuator 185 keeps the locking mechanism in an open position as the occupant adjusts seat back 130 towards a preferred orientation, and then issues instructions to the locking mechanism to engage in a locked position in response to seat back 130 attaining the preferred orientation.

Illustratively, prior to receiving instructions from an occupant through occupant input 170, the locking mechanism may be in a locked position by default. In response to receiving instructions from an occupant through occupant input 170, memory recall 175 communicates ($\theta_C(\text{pref})$) to mover controller 180. Mover controller 180 obtains current seat back recline angle ($\theta_C$) from position calculator 160, which it compares with ($\theta_C(\text{pref})$). If current seat back recline angle ($\theta_C$) is not equal to ($\theta_C(\text{pref})$), mover controller 180 issues a signal to seat-back actuator 185 indicating that ($\theta_C$) is not equal to ($\theta_C(\text{pref})$). Seat-back actuator 185 powers the locking mechanism as to disengage and assume an open position.

The occupant can then rotate seat back 130 relative to seat bottom 125 using seat-back actuator 185. Vehicle 143 may include a display that indicates to the occupant whether the occupant should rotate seat back 130 forwards or backwards in order to place seat back 130 in the preferred orientation. For example, if current seat back recline angle ($\theta_C$) is larger than ($\theta_C(\text{pref})$), vehicle 143 may indicate that seat back 130 should be rotated forward. If current seat back recline angle ($\theta_C$) is smaller than ($\theta_C(\text{pref})$), vehicle 143 may indicate that seat back 130 should be rotated backward.

To rotate seat back 130 forwards or backwards, vehicle 143 includes, for example, an electronic push-button, electronic dial, or other electronic mechanism (not shown) that allows the occupant to instruct seat-back actuator 185 to rotate seat back 130 forwards or backwards. Alternatively, seat-back actuator 185 may include manual controls, such as knobs or levers (not shown), through which the occupant can cause rotation of seat back 130 forwards or backwards.

As the occupant causes rotation of seat back 130, mover controller 180 continues to receive updated calculations from position calculator 160 regarding current seat back recline angle ($\theta_C$), and compares those values to ($\theta_C(\text{pref})$). For example, mover controller 180 may retrieve updated calculations at a predetermined sampling rate, such as 10 times per second, 100 times per second, etc.

In response to determining that current seat back recline angle ($\theta_C$) is equal to, or within a predetermined tolerance of, ($\theta_C(\text{pref})$), mover controller 180 may instruct the seat-back actuator 185 to engage the locking mechanism. In response, the seat-back actuator 185 may power the locking mechanism to engage and assume a locked position. This prevents the occupant from further rotating seat back 130, thus facilitating the occupant in placing and locking vehicle seat 120 in a preferred orientation.

Depending on the sampling at which mover controller 180 receives updated calculations from position calculator 160 and the responsive time with which seat-back actuator 185 can cause the locking mechanism to engage in response to instructions from mover controller 180, the occupant may rotate seat back 130 too far, as to overshoot preferred seat back recline angle ($\theta_C(\text{pref})$). This is because current seat back recline angle ($\theta_C$) may equal preferred seat back recline angle ($\theta_C(\text{pref})$) at a particular point in time, but mover controller 180 may not receive an updated calculation on current seat back recline angle ($\theta_C$) until a later point in time dependent upon the sampling rate. Moreover, the locking mechanism may not engage until a still further point in time, depending on signaling speeds of mover controller 180 and seat-back actuator 185, and the response time of the locking mechanism.

Thus, in certain embodiments, mover controller 180 may implement predictive algorithms that issue a signal to seat-back actuator 185 at a point in time prior to the occupant reclining seat back 130 to preferred seat back recline angle ($\theta_C(\text{pref})$). Mover controller 180 may be programmed with information regarding its sampling rate, a previously determined signaling speed for mover controller 180 and seat-back actuator 185, and a previously determined response time for the locking mechanism. Using this information, mover controller 180 may compute an expected time delay between when it issues a signal to seat-back actuator 185 indicating that the locking mechanism should engage, and when the locking mechanism actually engages.

During use, mover controller 180 may determine a rotational speed with which the occupant is rotating seat back 130 about pivot axis 195, and use extrapolation based on the rotational speed to determine a future point in time at which seat back 130 is predicted to achieve preferred seat back recline angle ($\theta_C(\text{pref})$). If the current time plus the expected time delay is equal to or within a predetermined tolerance of the future point in time at which seat back 130 is predicted to achieve preferred seat back recline angle ($\theta_C(\text{pref})$), mover controller 180 issues a signal to seat-back actuator 185, which powers the locking mechanism as to assume a locked position. By the time the locking mechanism engages, seat back 130 should have achieved an angle of recline approximately equal to ($\theta_C(\text{pref})$).

Figure 5:
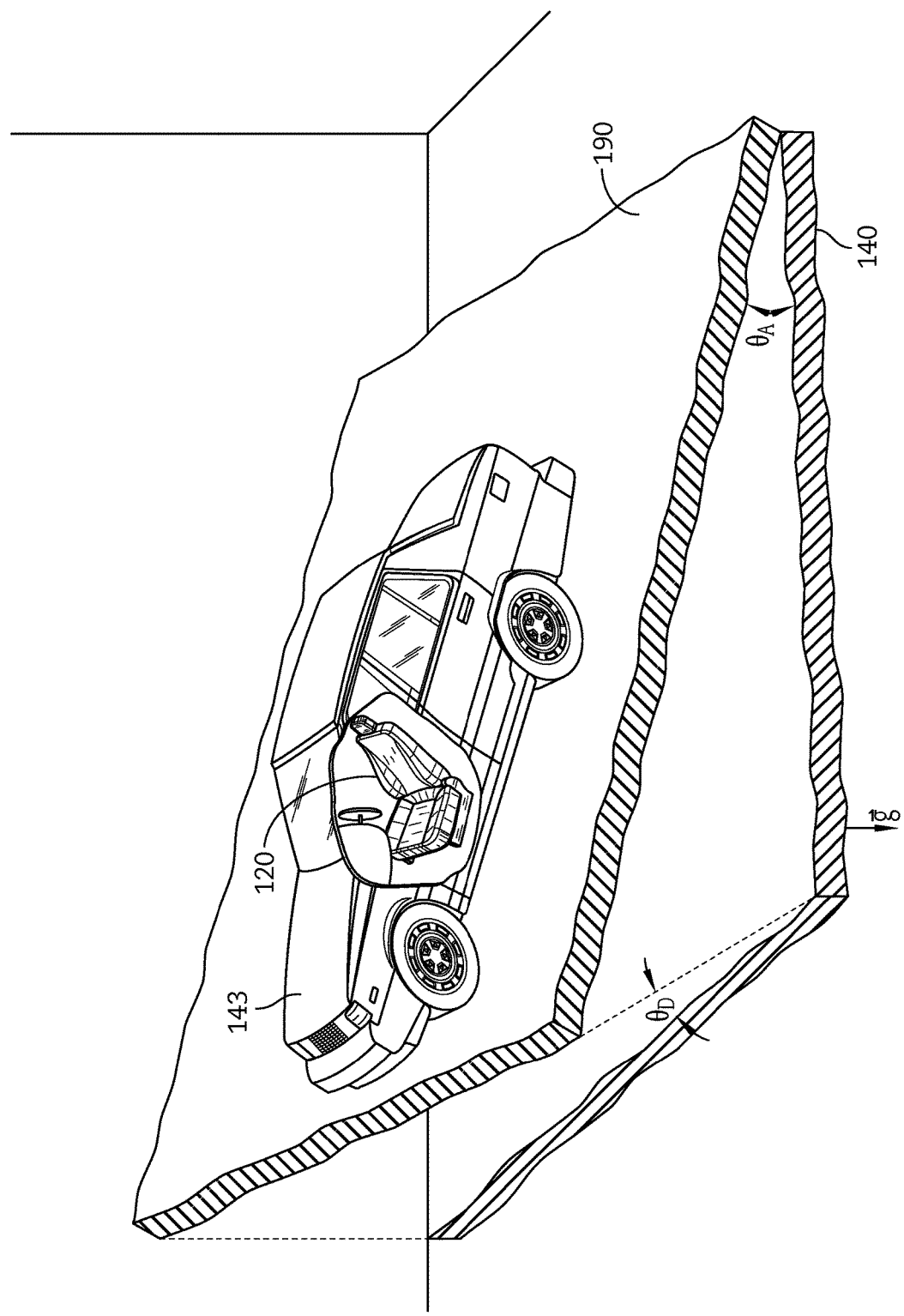
FIG. 5 is a perspective view of a vehicle including a seat position sensing system in accordance with the present disclosure showing that the vehicle is located on a hill causing the vehicle to have a gravity-based incline angle ($\theta_A$) and a gravity-based tilt angle ($\theta_D$)

As explained above, seat position sensing system 100 calculates an adjusted seat back recline angle ($\theta_C$) that controls for a vehicle incline angle ($\theta_A$), which may arise because vehicle 143 is driving uphill. In another respect, seat position sensing system 100 also controls for uneven terrain that may cause vehicle 143 to tilt about an x-axis, resulting in a vehicle tilt angle ($\theta_D$), as suggested in FIGS. 5-6. Vehicle 143 is on an uphill and tilted terrain 190 as shown in FIG. 5. This causes vehicle floor 135 to form a positive vehicle incline angle ($\theta_A$), and a positive vehicle tilt angle ($\theta_D$) with respect to reference plane 140.

Figure 6:
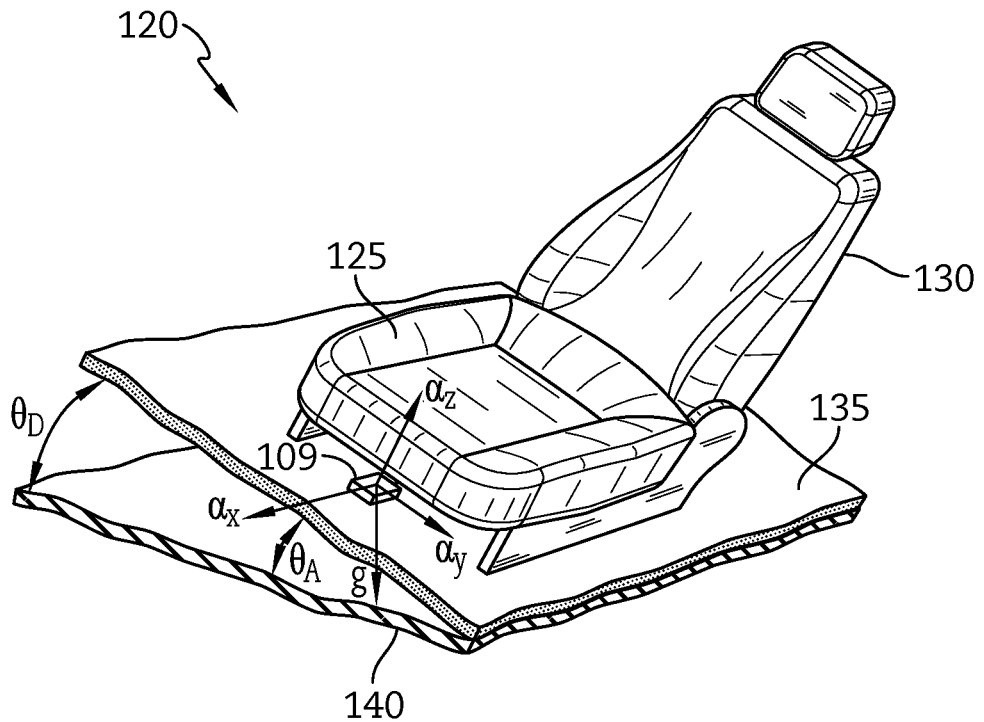
FIG. 6 is a perspective view of the seat position sensing system of FIG. 5 suggesting that the gravity-based incline angle of the vehicle is not influenced by the presence of the gravity-based tilt angle of the vehicle.

FIG. 6 illustrates that first angle calculator 150, using calculations described above in connection with FIG. 1, controls for a positive vehicle tilt angle ($\theta_D$). FIG. 6 compares the calculations performed by first angle calculator 150 in the situations in which vehicle tilt angle ($\theta_D$) is 0° (i.e., there is no tilt) and situations in which vehicle tilt angle ($\theta_D$) is positive. As shown in FIG. 6, the calculation performed in both situations is the same, namely, [arctan(($\alpha_x$)/($\alpha_z$))].

Illustratively, the calculations relevant to the situation in which vehicle tilt angle ($\theta_D$) is 0° is shown on the left-hand side of FIG. 6. Here, acceleration ($\alpha_x$), as measured by vehicle orientation sensor 109, is equal to an acceleration of gravity scaled by the factor $\sin(\theta_A)$. Thus, as vehicle incline angle ($\theta_A$) increases from 0° to 90°, acceleration ($\alpha_x$) will increase in value from 0 to the acceleration of gravity. Similarly, acceleration ($\alpha_z$), as measured by vehicle orientation sensor 109, is equal to an acceleration of gravity scaled by the factor $\cos(\theta_A)$. Thus, as vehicle incline angle ($\theta_A$) increases from 0° to 90°, acceleration ($\alpha_z$) will decrease in value from the acceleration of gravity to 0. As previously explained, angle calculator 150 computes vehicle incline angle ($\theta_A$) as $[\arctan((\alpha_x)/(\alpha_y))]$.

The calculations relevant to the situation in which vehicle tilt angle ($\theta_D$) is greater than 0° is shown on the right-hand side of FIG. 6. As shown, accelerations ($\alpha_x$) and ($\alpha_z$) will both further be scaled by a quantity $\cos(\theta_D)$. Thus, as angle of vehicle tilt increases from 0° to 90°, acceleration ($\alpha_x$) and ($\alpha_z$) will both decrease. However, because both ($\alpha_x$) and ($\alpha_z$) are decreased by the same factor of $\cos(\theta_D)$, this factor cancels and has no net effect on the computation performed by angle calculator 150—namely, $[\arctan((\alpha_x)/(\alpha_z))]$ is equal to $[\arctan((\alpha_x)*\cos(\theta_D)/(\alpha_z)*\cos(\theta_D))]$. As such, angle calculator 150 arrives at the correct value for vehicle incline angle ($\theta_A$) regardless of whether vehicle 143 also experiences a vehicle tilt angle ($\theta_D$). For similar reasons, second angle calculator 151 likewise arrives at the correct value for actual seat back recline angle ($\theta_B$) regardless of whether vehicle 143 experiences a vehicle tilt angle ($\theta_D$).

Vehicle orientation sensor 109, seat-back sensor 107, and seat-motion controller 110 can be mounted in a variety of locations. Vehicle orientation sensor 109 is mounted illustratively to vehicle floor 135 at a location below a front end 125a of seat bottom 125, as shown in FIGS. 1, 2, and 3. However, vehicle orientation sensor 109 may be mounted in other suitable locations within vehicle 143, including any location such that vehicle orientation sensor 109 inclines or declines along with vehicle floor 135 as vehicle incline angle ($\theta_A$) changes (e.g., when vehicle 143 drives uphill or downhill). Generally, any location fixed relative to vehicle floor 135 may be suitable.

For example, because seat bottom 125 is provided on seat foundation 127 anchored to vehicle floor 135, seat bottom 125 may maintain a consistent angular orientation relative to vehicle floor 135 as vehicle incline angle ($\theta_A$) changes. Accordingly, in illustrative embodiments, vehicle orientation sensor 109 may be mounted to seat bottom 125. In such an embodiment, the adjusted seat back recline angle would be computed relative to seat bottom 125, rather than vehicle floor 135. An exemplary adjusted seat back recline angle that is computed relative to seat bottom 125 is depicted in FIG. 1 as ($\theta_C$(seat bottom)). Computing the adjusted seat back recline angle relative to seat bottom 125 would still allow seat position sensing system 100 to control for uneven terrain on which vehicle 143 may drive, because as vehicle 143 inclines, seat bottom 125 will incline in consistent angular relationship with vehicle 143. For purposes of this illustrative explanation, however, an adjusted seat back recline angle ($\theta_C$) computed relative to vehicle floor 135 has be used, rather than ($\theta_C$(seat bottom)), even though either would be suitable.

Figure 4:
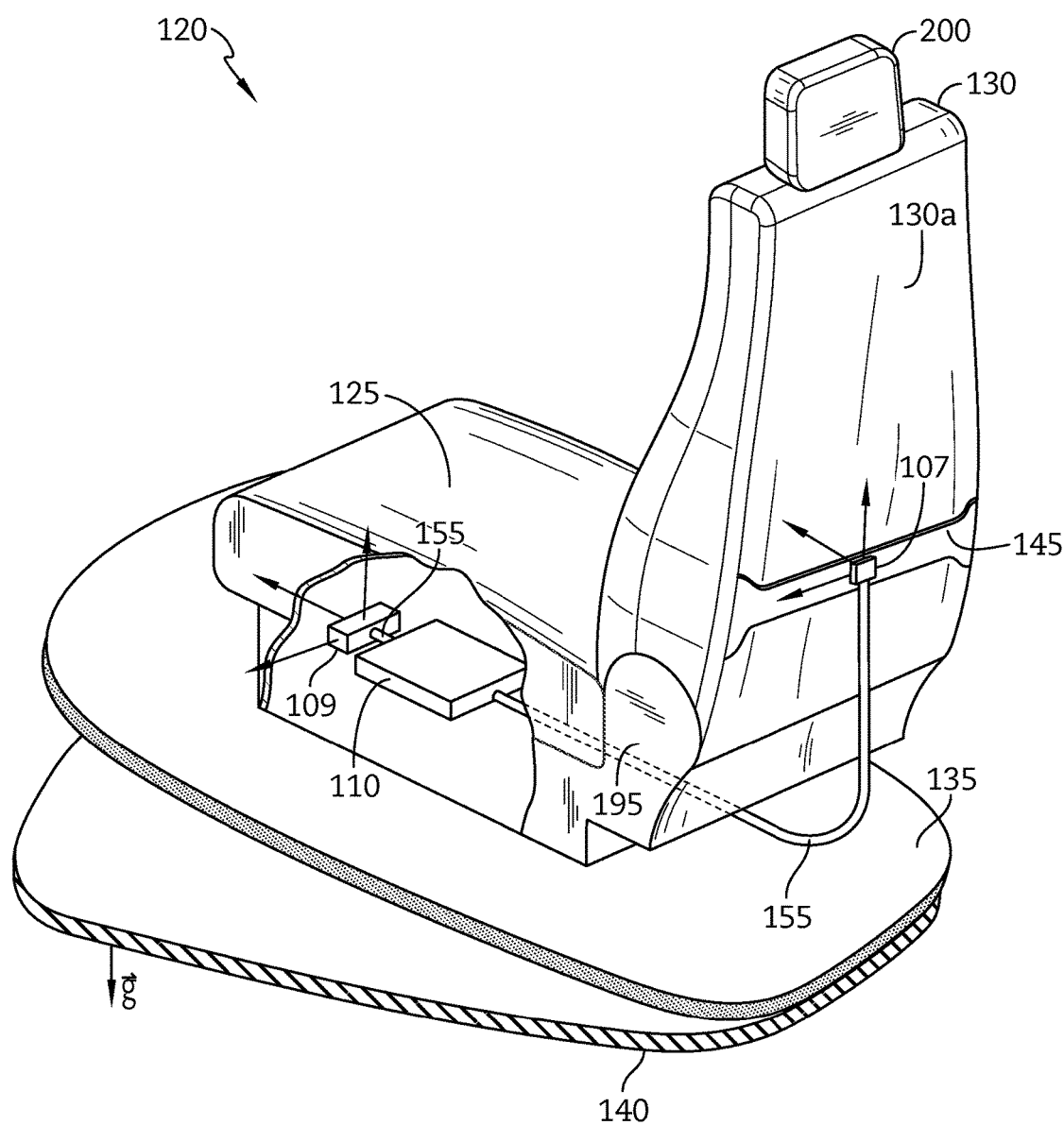
FIG. 4 is a perspective view of the seat position sensing system of FIG. 1 with portions broken away to reveal the vehicle-orientation sensor coupled to the vehicle floor, the seat-motion controller coupled to the vehicle floor and to the vehicle-orientation sensor, and the seat-back sensor coupled to the seat back and to the seat-motion controller.

Seat-back sensor 107 is illustratively mounted to a crossbar 145 that spans laterally across a rear surface 130a of seat back 130, as shown in FIG. 4. However, seat-back sensor 107 may be mounted in other suitable locations, including any location such that seat-back sensor 107 maintains a consistent angular orientation relative to seat back 130 as seat back 130 rotates relative to seat bottom 125. In illustrative embodiments, seat-back sensor 107 is mounted adjacent to a lower of rear surface 130a, closer to pivot axis 195 than to head rest 200. During driving conditions, seat back 130 may rotate back and forth about pivot axis 195 in vibratory fashion due to rough terrain encountered by vehicle 143. Seat-back sensor 107, being affixed to seat back 130, will also experience these vibratory motions, which may introduce unwanted noise components into the signals generated by seat-back sensor 107 communicating accelerations ($\alpha_x$), ($\alpha_y$), and ($\alpha_z$) to seat-motion controller 110. During such vibratory motions, higher regions of seat back 130, such as those closer to head rest 200, may experience larger displacements from such vibratory motion than lower regions of seat back 130, such as those closer to pivot axis 195. As such, mounting seat-back sensor 107 closer to pivot axis 195 may enable seat-back sensor 107 to generate signals less susceptible to noise caused by vibratory motions.

Seat-motion controller 110 is illustratively mounted to vehicle floor 135 below seat bottom 125 and rearward from vehicle orientation sensor 109, as shown in FIGS. 2-4. Seat-motion controller is in electrical communication with seat-back sensor 107 and vehicle orientation sensor 109 through electrical cabling 155. However, seat-motion controller 110 may be located in any position within vehicle 143 such that it can be placed in wired or wireless electrical communication with seat-back sensor 107 and vehicle orientation sensor 109.

Seat-motion controller 110, including first angle calculator 150, second angle calculator 151, position calculator 160, memory 165, memory recall 175, and mover controller 180, may be implemented in software, compiled and stored to a memory as object code, and during operation of the seat position sensing system 100, may be invoked for execution by a processor. In one implementation, the above-described components are implemented as a single system on a chip. The interconnections among the above-described components can be provided through any suitable electronic communication mechanism, such as a communication bus or cabling. In other implementations, the above-described components may be implemented on separate hardware modules and placed in communication with one another through any suitable electronic communication mechanism, such as a communication bus or cabling.

A second embodiment of a seat position sensing system 700 in accordance with the present disclosure is shown, for example, in FIGS. 7-9. Seat position sensing system 700 enables the functionality of seat position sensing system 100, and additionally calculates and stores a preferred longitudinal position of vehicle seat 120. Thus, similar to seat position sensing system 100, seat position sensing system 700 calculates an adjusted seat back recline angle ($\theta_C$) for seat back 130 relative to vehicle floor 135. Additionally, seat position sensing system 700 calculates a longitudinal position (d) of vehicle seat 120, including seat bottom 125, relative to vehicle floor 135. In this illustrative embodiment, longitudinal position (d) is measured from a front end 127a of seat foundation 127 to a reference point on vehicle floor 135 towards the front of vehicle 143 (e.g., near a gas pedal, not shown). However, other reference points can be used to measure a longitudinal position of vehicle seat 120, including any component in consistent movable relationship with vehicle seat 120 in combination with any component on or affixed to vehicle floor 135.

Seat position sensing system 700 includes a seat-orientation unit 705 and a seat-motion controller 710. Similar to seat-orientation unit 105, discussed above, seat-orientation unit 705 senses an orientation of seat back 130 and an orientation of vehicle floor 135. Seat-orientation unit 705 additionally generates outputs from a linear position sensor 702, which are used to compute longitudinal position (d) of vehicle seat bottom 125. Similar to seat-motion controller 110, discussed above, seat-motion controller 710 calculates a vehicle incline angle, an actual seat back recline angle, and an adjusted seat back recline angle relative to the vehicle incline angle. Seat-motion controller 710 additionally calculates a rotation amount (ρ) of linear position sensor 702, and uses rotation amount (ρ) to calculate a longitudinal position (d) seat bottom 125 relative to vehicle floor 135.

Seat-orientation unit 705 includes several components that correspond to like components described in connection with seat position sensing system 100. Illustratively, seat-orientation unit 705 includes vehicle orientation sensor 109 to sense an orientation of vehicle floor 135 relative to gravity by measuring and outputting accelerations ($\alpha_x$), ($\alpha_y$), and ($\alpha_z$). Seat-orientation unit 705 also includes seat-back sensor 107 configured to sense an orientation of seat back 130 relative to gravity by measuring and outputting accelerations ($\beta_x$), ($\beta_y$), and ($\beta_z$).

Likewise, seat-motion controller 710 includes several components that correspond with components described in connection with seat position sensing system 100. Thus, seat-motion controller 710 includes first angle calculator 150 for calculating vehicle incline angle ($\theta_A$), second angle calculator 151 for calculating actual seat back recline angle ($\theta_B$), and position calculator 160 for computing adjusted seat back recline angle ($\theta_C$). Seat-motion controller 710 also includes memory 165 for storing preferred seat back recline angle ($\theta_C$(pref)), occupant input 170 for receiving occupant inputs, memory recall 175 for retrieving preferred seat back recline angle ($\theta_C$(pref)), and mover controller 180 and seat-back actuator 185 for either powered rotation or to facilitate manual adjustment of seat back 130.

Seat-orientation unit 705 additionally includes linear position sensor 702. Outputs from linear position sensor 702 are used by seat-motion controller 710 to compute longitudinal position (d) of seat bottom 125. To generate outputs from which longitudinal position (d) can be calculated, linear position sensor 702 includes an accelerometer 765 that rotates as seat bottom 125 is moved, as suggested in FIGS. 8A-9. Accelerometer 765 generates outputs that vary based on rotation amount (ρ) of accelerometer 765. Based on the outputs of accelerometer 765, seat-motion controller 710 computes rotation amount (ρ), as shown in FIG. 7. Position calculator 160 then converts rotation amount (ρ) to longitudinal position (d) based on mathematical formulae, as shown in FIGS. 7-8C.

Illustratively, linear position sensor 702 includes a roller 745 rotatably engaged with a track 740, a rotating shaft 750, a reduction unit 760, and accelerometer 765, as shown in FIGS. 8A-9. Track 740 is fixedly mounted to vehicle floor 135, and seat foundation 127 is slidably engaged with track 740, such as through slide rails (not shown) that slidably couple with grooves in track 740. Sliding seat foundation 127 enables seat bottom 125, which is mounted to seat foundation 127, to move forwards or backwards to desired longitudinal positions, carrying the entire vehicle seat 120 therewith. In certain embodiments, seat foundation 127 may move through powered mechanisms, and in other embodiments, seat foundation 127 may be moved manually by an occupant.

Linear position sensor 702 is coupled to seat bottom 125, and moves longitudinally therewith. As seat bottom 125 moves, roller 745 rotatably engages with an outer surface 740a of track 740. As such, the amount of rotation of roller 745 correlates with the amount of longitudinal displacement of seat bottom 125. The rotation of roller 745 is transmitted through rotating shaft 750, which is coupled to roller 745 as to rotate therewith. Rotating shaft 750 transmits rotation through reduction unit 760 to accelerometer 765. In one example, reduction unit 760 is a gearbox, however, reduction unit 760 may be any other suitable alternative. In the example where reduction unit 760 is a gearbox, the gearbox includes a plurality of inter-meshed gears (not shown) having gear ratios selected such that accelerometer 765 rotates at a predefined rate of rotation relative to the longitudinal displacement of seat bottom 125.

In illustrative embodiments, the predefined rate of rotation for accelerometer 765 is approximately 1.93° per 5 mm of longitudinal displacement of seat bottom 125, or 2.58 mm per degree. Illustratively, the full longitudinal length 740b of track 740 is approximately 225 mm, providing for a total of approximately 87° of rotation of accelerometer 765 over the full longitudinal length 740b of track 740. Other rates of rotation may be used, and larger amounts of rotation relative to longitudinal displacement of seat bottom 125 may increase accuracy. In illustrative embodiments, accelerometer 765 may have a rate of rotation sufficiently large such that accelerometer 765 may complete several full rotations as seat bottom 125 moves longitudinally along the full length 740b of track 740—e.g., more than 360°. Because cable 155 connects to accelerometer 765, as shown in FIG. 9, and may rotate therewith, a cable spooler or other cable management mechanism may be provided such that cable 155 does not interfere with other componentry during rotations of accelerometer 765.

As accelerometer 765 rotates according to its predefined rate of rotation, accelerometer 765 measures and outputs accelerations ($\gamma_x$), ($\gamma_y$), and ($\gamma_z$) relative to gravity along three directional axes x, y, and z, as suggested in FIGS. 7-9. Linear position sensor 702 communicates accelerations ($\gamma_x$), ($\gamma_y$), and ($\gamma_z$) to rotation calculator 715, which calculates a rotation amount (ρ) of accelerometer 765 using mathematical formulae. The mathematical formulae factor how rotation amount (ρ) varies as a function of accelerations ($\gamma_x$), ($\gamma_y$), and ($\gamma_z$), each of which are measured relative to gravity. In this illustrative embodiment, the formula [$\arctan((\gamma_x)/(\gamma_z))$] is used to compute (ρ), as shown in FIG. 7. Accelerations ($\gamma_x$), ($\gamma_y$), and ($\gamma_z$) may be encoded digitally and transmitted with any suitable resolution, and illustratively may be transmitted with 10 bit resolution. Linear position sensor 702 may discard a certain number of least significant bits, such as the two least significant bits, to suppress noise.

Rotation calculator 715 communicates rotation amount (ρ) to position calculator 160, which converts rotation amount (ρ) to longitudinal position (d) of seat bottom 125. Position calculator 160 determines longitudinal position (d) by controlling for any uneven terrain that vehicle 143 may be driving on, and by factoring the predefined rate of rotation of accelerometer 765.

Position calculator 160 controls for uneven terrain that vehicle 143 may be driving on by subtracting vehicle incline angle ($\theta_A$) from (ρ)—i.e., [(ρ)−($\theta_A$)]. As previously explained, uneven terrain, such as hills, may cause vehicle 143 to be positioned at a vehicle incline angle ($\theta_A$). This may cause accelerometer 765 to incline therewith, causing changes to output accelerations ($\gamma_x$), ($\gamma_y$), and ($\gamma_z$) and thereby causing changes to computed rotation amount (ρ). Because vehicle incline angle ($\theta_A$) may vary from one moment to the next, rotation amount (ρ) should be controlled for vehicle incline angle ($\theta_A$), so that longitudinal position calculations for seat bottom 125 are not improperly skewed by changing angles of vehicle incline angle ($\theta_A$).

After controlling for vehicle incline angle ($\theta_A$), position calculator 160 factors the predefined rate of rotation of accelerometer 765 by scaling with a constant scaling factor. For example, where accelerometer 765 rotates at a rate of 1.93° per 5 mm of longitudinal displacement, position calculator 160 illustratively scales [($\rho$)–($\theta_A$)] by 2.58 mm/degree. The resulting value represents longitudinal position (d) of seat bottom 125 relative to vehicle floor 135.

FIGS. 8A-8C illustrate the operation of linear position sensor 702, rotation calculator 715, and position calculator 160. In FIG. 8A, vehicle seat 120 occupies a first position 801. Accelerometer 765 of linear position sensor 702 occupies a first orientation, as reflected by the orientation of the x and z directional axes of accelerometer 765. At this orientation, rotation calculator computes ($\rho$) to be 10°. Position calculator computes the corresponding longitudinal position (d) to be a relatively small amount. In FIG. 8B, an occupant has moved vehicle seat 120 to a second position 802 rearward of first position 801. As vehicle seat 120 moves to second position 802, roller 745 rotates along outer surface 740a of track 740, causing rotation of accelerometer 765 to a second orientation, as reflected by the new orientation of its x and z directional axes. At this orientation, rotation calculator computes ($\rho$) to be 45°. Position calculator computes the corresponding longitudinal position (d) to be a second, intermediate amount. Finally, in FIG. 8C, an occupant has moved vehicle seat 120 to a third position 803 rearward of second position 802. As vehicle seat 120 moves to third position 803, roller 745 rotates still further, causing rotation of accelerometer 765 to a third orientation, as reflected by the new orientation of its x and z directional axes. At this orientation, rotation calculator computes ($\rho$) to be 85°. Position calculator computes the corresponding longitudinal position (d) to be a third, relatively large amount.

After an occupant of vehicle 143 adjusts seat bottom 125 to a desired longitudinal position, position calculator 160 may store longitudinal position (d) of seat bottom 125, as computed at that time, to memory 165. Memory 165 stores this value as a preferred longitudinal position (d(pref)) of seat bottom 125. By storing (d(pref)) in memory, an occupant may later instruct seat motion controller 710 to return seat bottom 125 to preferred longitudinal position (d(pref)). Alternatively, the occupant may manually adjust seat bottom 125, with seat motion controller 710 controlling a locking mechanism that locks seat bottom 125 once it arrives at preferred longitudinal position (d(pref)). Thus, in illustrative embodiments, seat-motion controller 710 includes components that subsequently adjust, or facilitate a user in manually adjusting, seat bottom 125 to preferred longitudinal position (d(pref)). These components include occupant input 170, memory recall 175, mover controller 180, and linear rail actuator 725.

An occupant, during a subsequent use of vehicle 143, may desire to have seat bottom 125 adjusted to preferred longitudinal position (d(pref)). This is may be achieved through powered mechanisms similar to the manner by which seat back 130 may be adjusted to preferred seat back recline angle ($\theta_C$(pref)) through powered mechanisms. Illustratively, the occupant uses occupant input 170 to instruct seat position sensing system 700 that seat bottom 125 should be adjusted to preferred longitudinal position (d(pref)). In response to receiving an instruction from the occupant through occupant input 170, memory recall 175 retrieves preferred longitudinal position (d(pref)) from memory 165 and communicates (d(pref)) to mover controller 180.

In certain embodiments, mover controller 180 automatically adjusts seat bottom 125 as necessary until a current longitudinal position (d), as computed by position calculator 160, is equal to preferred longitudinal position (d(pref)). In other embodiments, mover controller 180 facilitates an occupant in manually sliding seat bottom 125 relative to vehicle floor 135 as necessary until current longitudinal position (d) is equal to preferred longitudinal position (d(pref)).

In embodiments in which mover controller 180 automatically adjusts seat bottom 125, mover controller receives from position calculator 160 a current longitudinal position (d). Mover controller 180 sends instructions to linear rail actuator 725 to slide seat foundation 127 along track 740 via slide rails (not shown) either forwards or backwards, depending on how current longitudinal position (d) compares to (d(pref)). For example, if current longitudinal position (d) is larger than (d(pref)), mover controller 180 will instruct linear rail actuator 725 to slide seat foundation 127 forward. If current longitudinal position (d) is smaller than (d(pref)), mover controller 180 will instruct linear rail actuator 725 to slide seat foundation 127 backward.

As linear rail actuator 725 slides seat foundation 127, mover controller 180 continues to receive results of updated calculations from position calculator 160 regarding current longitudinal position (d). For example, mover controller 180 retrieves updated calculations at a predetermined sampling rate, such as 10 times per second, 100 times per second, etc. Mover controller 180 continues to issue instructions to linear rail actuator 725 as appropriate, depending on how current longitudinal position (d) compares to (d(pref)). For example, if linear rail actuator 725 slides seat foundation 127 too far, as to overshoot (d(pref)), mover controller 180 may instruct linear rail actuator 725 to reverse the direction of sliding.

When current longitudinal position (d) is equal to, or within a predetermined tolerance of, (d(pref)), mover controller 180 instructs linear rail actuator 725 to cease movement. Seat bottom 125 will then be in the longitudinal position preferred by the occupant.

In other embodiments, mover controller 180 facilitates an occupant in manually adjusting seat bottom 125 relative to vehicle floor 135. In such embodiments, vehicle seat 120 may include a selectively releasable locking mechanism (not shown) powered by linear rail actuator 725. Upon signaling from linear rail actuator 725, the locking mechanism can disengage to assume an open position, or engage to assume a locked position. In an open position, seat foundation 127 is permitted to slide relative to vehicle floor 135, allowing the occupant to manually adjust seat bottom 125. In a locked position, seat foundation 127 is blocked from movement relative to vehicle floor 135. Mover controller 180 keeps the locking mechanism in an open position as the occupant adjusts seat bottom 125 towards a preferred longitudinal position, and then locks the locking mechanism in response to seat bottom 125 attaining the preferred orientation.

Illustratively, prior to receiving instructions from an occupant through occupant input 170, the locking mechanism may be in a locked position by default. In response to receiving instructions from an occupant through occupant input 170, memory recall 175 retrieves and communicates (d(pref)) to mover controller 180. Mover controller 180 obtains current longitudinal position (d) from position calculator 160, which it compares with (d(pref)). If current longitudinal position (d) is not equal to (d(pref)), mover controller 180 issues a signal to linear rail actuator 725, which releases the locking mechanism into an open position.

The occupant can then move seat bottom 125 by sliding seat foundation 127 relative to vehicle floor 135 using linear rail actuator 725. Vehicle 143 may include a display that indicates to the occupant whether the occupant should slide seat bottom 125 forwards or backwards in order to place seat foundation 127 in the preferred position. For example, if current longitudinal position (d) is larger than (d(pref)), vehicle 143 may indicate that seat bottom 125 should be moved forward. If current longitudinal position (d) is smaller than (d(pref)), vehicle 143 may indicate that seat bottom 125 should be moved backward.

To slide seat foundation 127 forwards or backwards, vehicle 143 includes, for example, an electronic push-button, electronic dial, or other electronic mechanism (not shown) that allows the occupant to manually slide seat foundation 127 forwards or backwards. Alternatively, linear rail actuator 725 may include hand controls, such as knobs or levers (not shown), through which the occupant can manually cause movement of seat foundation 127 forwards or backwards.

As the occupant causes movement of seat bottom 125, mover controller 180 continues to receive updated calculations from position calculator 160 regarding current longitudinal position (d), and compares those values to (d(pref)). For example, mover controller 180 may retrieve updated calculations at a predetermined sampling rate such as 10 times per second, 100 times per second, etc. In response to determining that current longitudinal position (d) is equal to, or within a predetermined tolerance of, (d(pref)), mover controller 180 may instruct linear rail actuator 725 to engage the locking mechanism to assume a locked position. This prevents the occupant from further sliding seat foundation 127, thus facilitating the occupant in placing and locking vehicle seat 120 in a preferred position.

Depending on the sampling at which mover controller 180 receives updated calculations from position calculator 160 and the responsive time with which linear rail actuator 725 can cause the locking mechanism to engage in response to instructions from mover controller 180, the occupant may move seat bottom 125 too far, as to overshoot preferred longitudinal position (d(pref)). This is because current longitudinal position (d) may equal preferred longitudinal position (d(pref)) at a particular point in time, but mover controller 180 may not receive an updated calculation on current longitudinal position (d) until a later point in time dependent upon the sampling rate. Moreover, the locking mechanism may not engage until a still further point in time, depending on signaling speeds of mover controller 180 and linear rail actuator 725, and the response time of the locking mechanism.

Thus, in certain embodiments, mover controller 180 may implement predictive algorithms that issue a signal to linear rail actuator 725 at a point in time prior to the occupant moving seat bottom 125 to preferred longitudinal position (d(pref)). Mover controller 180 may be programmed with information regarding its sampling rate, a previously determined signaling speed for mover controller 180 and linear rail actuator 725, and a previously determined response time for the locking mechanism. Using this information, mover controller 180 may compute an expected time delay between when it issues a signal to linear rail actuator 725 indicating that the locking mechanism should engage, and when the locking mechanism actually engages.

During use, mover controller 180 may determine a speed with which the occupant is moving seat bottom 125, and use extrapolation based on the speed to determine a future point in time at which seat bottom 125 is predicted to achieve preferred longitudinal position (d(pref)). If the current time plus the expected time delay is equal to or within a predetermined tolerance of the future point in time at which seat bottom 125 is predicted to achieve preferred longitudinal position (d(pref)), mover controller 180 issues a signal to linear rail actuator 725, which powers the locking mechanism as to assume a locked position. By the time the locking mechanism engages, seat bottom 125 should have achieved an position approximately equal to preferred longitudinal position (d(pref)).

As with seat-motion controller 110, seat-motion controller 710 is illustratively mounted to vehicle floor 135 and is in electrical communication with seat-back sensor 107, vehicle orientation sensor 109, and linear position sensor 702 through electrical cabling 155, as shown in FIG. 9. However, seat-motion controller 710 may be located in any position within vehicle 143 such that it can be placed in wired or wireless electrical communication with seat-back sensor 107, vehicle orientation sensor 109, and linear position sensor 702.

As with seat-motion controller 110, seat-motion controller 710 and all its components, including rotation calculator 715, may be implemented in software, compiled and stored to a memory as object code, and during operation of the seat position sensing system 700, may be invoked for execution by a processor. In one implementation, the above-described components are implemented as a single system on a chip. The interconnections among the above-described components can be provided through any suitable electronic communication mechanism, such as a communication bus or cabling. In other implementations, the above-described components may be implemented on separate hardware modules and placed in communication with one another through any suitable electronic communication mechanism, such as a communication bus or cabling.

In illustrative embodiments, seat-back sensor 107, vehicle orientation sensor 109, and linear position sensor 702 may be coupled with a temperature-sensitive component, such as a thermistor, which enables their respective accelerometers to compensate and correct for output drift or other variations in output accuracy caused by temperature changes.

In illustrative embodiments, vehicle 143 includes mechanisms to cap the speed at which seat back 130 can rotate and/or the speed at which seat foundation 127 can longitudinally move. A speed cap can be beneficial to ensure that position calculator 160 receives a sufficient number of samples as seat back 130 rotates and/or as seat foundation 127 slides. As such, the speed cap may be a function of the sampling rate of position calculator 160.

As previously explained, during driving conditions, vehicle 143 and its internal components may vibrate. Such vibrations may introduce noise into the outputs of seat-back sensor 107, vehicle orientation sensor 109, and linear position sensor 702. To mitigate the impact of such noise on system accuracy, seat-orientation units 105, 705 or seat-motion controllers 110, 710 may include filters or other signal processing components to enhance signal to noise ratios.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure.

The invention claimed is:

1. An occupant-support sensing system comprising
an occupant support including a seat bottom adapted to couple to a floor to move back and forth along a longitudinal axis relative to the floor and a seat back coupled to the seat bottom and arranged to extend upwardly away from the seat bottom to pivot about an axis relative to the seat bottom,
a support-orientation unit including a floor-orientation accelerometer coupled to the floor in a fixed position relative to the floor and configured to sense a gravity-based incline angle of the floor and a seat-back accelerometer coupled to the seat back to move therewith relative to the seat bottom and the floor and configured to sense a gravity-based recline angle of the seat back, and
a support-motion controller coupled to the occupant support and the support-orientation unit and configured to calculate a floor-incline angle using data received from the floor-orientation accelerometer, an actual seat-back angle using data received from the seat-back accelerometer, and an adjusted seat-back angle using the floor-incline angle and the actual seat-back angle,
wherein the support-motion controller includes a position calculator configured to calculate the adjusted seat-back angle using the floor-incline angle and the actual seat-back angle and
wherein the position calculator calculates the adjusted seat-back angle by subtracting the floor-incline angle from the actual seat-back angle.

2. The occupant-support sensing system of claim 1, wherein the support-motion controller further includes a mover controller coupled to the position calculator to receive the actual seat-back angle and a seat-back actuator coupled to the seat back to control movement of the seat back relative to the seat bottom in response to a signal received from the mover controller.

3. The occupant-support sensing system of claim 2, wherein the seat-back actuator is a motor coupled to the seat back and configured to move the seat back relative to the seat bottom in response the signal received from the mover controller.

4. The occupant-support sensing system of claim 2, wherein the seat-back actuator is coupled to a seat-back locking mechanism and configured to engage a locking mechanism of the occupant support to block movement of the seat back relative to the seat bottom in response to the signal received from the mover controller.

5. An occupant-support sensing system comprising
an occupant support including a seat bottom adapted to couple to a floor to move back and forth along a longitudinal axis relative to the floor and a seat back coupled to the seat bottom and arranged to extend upwardly away from the seat bottom to pivot about an axis relative to the seat bottom,
a support-orientation unit including a floor-orientation accelerometer coupled to the floor in a fixed position relative to the floor and configured to sense a gravity-based incline angle of the floor and a seat-back accelerometer coupled to the seat back to move therewith relative to the seat bottom and the floor and configured to sense a gravity-based recline angle of the seat back, and
a support-motion controller coupled to the occupant support and the support-orientation unit and configured to calculate a floor-incline angle using data received from the floor-orientation accelerometer, an actual seat-back angle using data received from the seat-back accelerometer, and an adjusted seat-back angle using the floor-incline angle and the actual seat-back angle,
wherein the support-motion controller includes a position calculator configured to calculate the adjusted seat-back angle using the floor-incline angle and the actual seat-back angle and
wherein the support-motion controller is further configured to determine a rotational speed of the seat back relative to the seat bottom and predict a future adjusted seat-back angle using the actual seat-back angle, the floor-incline angle, and the rotational speed of the seat back.

6. The occupant-support sensing system of claim 5, wherein the support-motion controller includes a mover controller configured to compute an expected time delay between issuing a command to a seat-back actuator included in the support-motion controller and detecting the adjusted seat-back angle matches the future adjusted seat-back angle.

7. The occupant-support sensing system of claim 6, wherein the mover controller sends the command to the seat-back actuator at the expected time delay to cause the adjusted seat-back angle to match the future adjusted seat-back angle.

8. An occupant-support sensing system comprising
an occupant support including a seat bottom adapted to couple to a floor to move back and forth along a longitudinal axis relative to the floor and a seat back coupled to the seat bottom and arranged to extend upwardly away from the seat bottom to pivot about an axis relative to the seat bottom,
a support-orientation unit including a floor-orientation accelerometer coupled to the floor in a fixed position relative to the floor and configured to sense a gravity-based incline angle of the floor and a seat-back accelerometer coupled to the seat back to move therewith relative to the seat bottom and the floor and configured to sense a gravity-based recline angle of the seat back, and
a support-motion controller coupled to the occupant support and the support-orientation unit and configured to calculate a floor-incline angle using data received from the floor-orientation accelerometer, an actual seat-back angle using data received from the seat-back accelerometer, and an adjusted seat-back angle using the floor-incline angle and the actual seat-back angle,
wherein the seat back includes a backrest coupled to the seat bottom to rotate about the axis relative to the seat bottom and a headrest coupled to the backrest to move therewith and locate the backrest between the headrest and the seat bottom and the seat-back accelerometer is coupled to the backrest between the axis and the headrest.

9. The occupant-support sensing system of claim 8, wherein the seat-back accelerometer is located nearer to the axis than a midpoint between the axis and the headrest.

10. An occupant-support sensing system comprising
an occupant support including a seat bottom adapted to couple to a floor to move back and forth along a longitudinal axis relative to the floor and a seat back coupled to the seat bottom and arranged to extend upwardly away from the seat bottom to pivot about an axis relative to the seat bottom,
a support-orientation unit including a floor-orientation accelerometer coupled to the floor in a fixed position relative to the floor and configured to sense a gravity-based incline angle of the floor and a seat-back accelerometer coupled to the seat back to move therewith relative to the seat bottom and the floor and configured to sense a gravity-based recline angle of the seat back, and a support-motion controller coupled to the occupant support and the support-orientation unit and configured to calculate a floor-incline angle using data received from the floor-orientation accelerometer, an actual seat-back angle using data received from the seat-back accelerometer, and an adjusted seat-back angle using the floor-incline angle and the actual seat-back angle, wherein the support-orientation unit further includes a linear-position accelerometer coupled to the seat bottom to move therewith relative to the floor and configured to sense a gravity-based rotation angle of the linear-position accelerometer relative to the seat bottom.

11. The occupant-support sensing system of claim 10, wherein the support-motion controller is further configured to calculate a longitudinal position of the seat bottom relative to the floor using the floor-incline angle and the gravity-based rotation angle from the linear-position accelerometer.

12. The occupant-support sensing system of claim 11, wherein the support-orientation unit further includes a conversion unit coupled to the seat bottom to move therewith and configured to convert back and forth movement of the seat bottom into rotational movement and the linear-position accelerometer coupled to the conversion unit to rotate relative to the seat bottom as the seat bottom moves back and forth along the longitudinal axis.

13. The occupant-support sensing system of claim 12, wherein the conversion unit includes a roller configured to engage a stationary track included in the occupant support, a rotating shaft coupled to the roller to move therewith, a reduction unit having an input coupled to the rotating shaft to rotate therewith and an output coupled to the linear-position accelerometer to cause the linear-position accelerometer to rotate in response to rotation of the roller.

14. The occupant-support sensing system of claim 11, wherein the support-motion controller includes a position calculator configured to calculate the adjusted seat-back angle using the floor-incline angle and the actual seat-back angle and the longitudinal position using the floor-incline angle and the gravity-based rotation angle.

15. The occupant-support sensing system of claim 14, wherein the position calculator calculates the adjusted seat-back angle by subtracting the floor-incline angle from the actual seat-back angle and the longitudinal position by subtracting the floor-incline angle from the gravity-based rotation angle.

16. The occupant-support sensing system of claim 15, wherein the support-motion controller further includes a mover controller coupled to the position calculator to receive the adjusted seat-back angle and the longitudinal position and a linear-rail actuator coupled to the seat bottom to control movement of the seat bottom relative to the floor in response to a signal received from the mover controller.

17. An occupant-support sensing system comprising
an occupant support including a seat bottom adapted to couple to a floor to move back and forth along a longitudinal axis relative to the floor and a seat back coupled to the seat bottom and arranged to extend upwardly away from the seat bottom to pivot about an axis relative to the seat bottom, a support-orientation unit including a floor-orientation accelerometer coupled to the floor in a fixed position relative to the floor and configured to measure and output accelerations relative to gravity of the floor and a seat-back accelerometer coupled to the seat back to move therewith and configured to measure and output accelerations relative to gravity of the seat back, and a support-motion controller coupled to the occupant support and the support-orientation unit and configured to calculate a floor-incline angle using output accelerations of the floor-orientation accelerometer, an actual seat-back angle using output accelerations of the seat-back accelerometer, and an adjusted seat-back angle using the floor-incline angle and the actual seat-back angle.

18. The occupant-support sensing system of claim 17, wherein the support-orientation unit further includes a linear-position accelerometer coupled to the seat bottom to move therewith relative to the floor and configured to measure and output accelerations relative to gravity of the linear-position accelerometer, the support-motion controller is configured to calculate a rotation amount of the linear-position accelerometer, and the support-motion controller is configured to convert the rotation amount into a longitudinal position of the seat bottom relative to the floor.

* * * * *